UNITED STATES PATENT OFFICE.

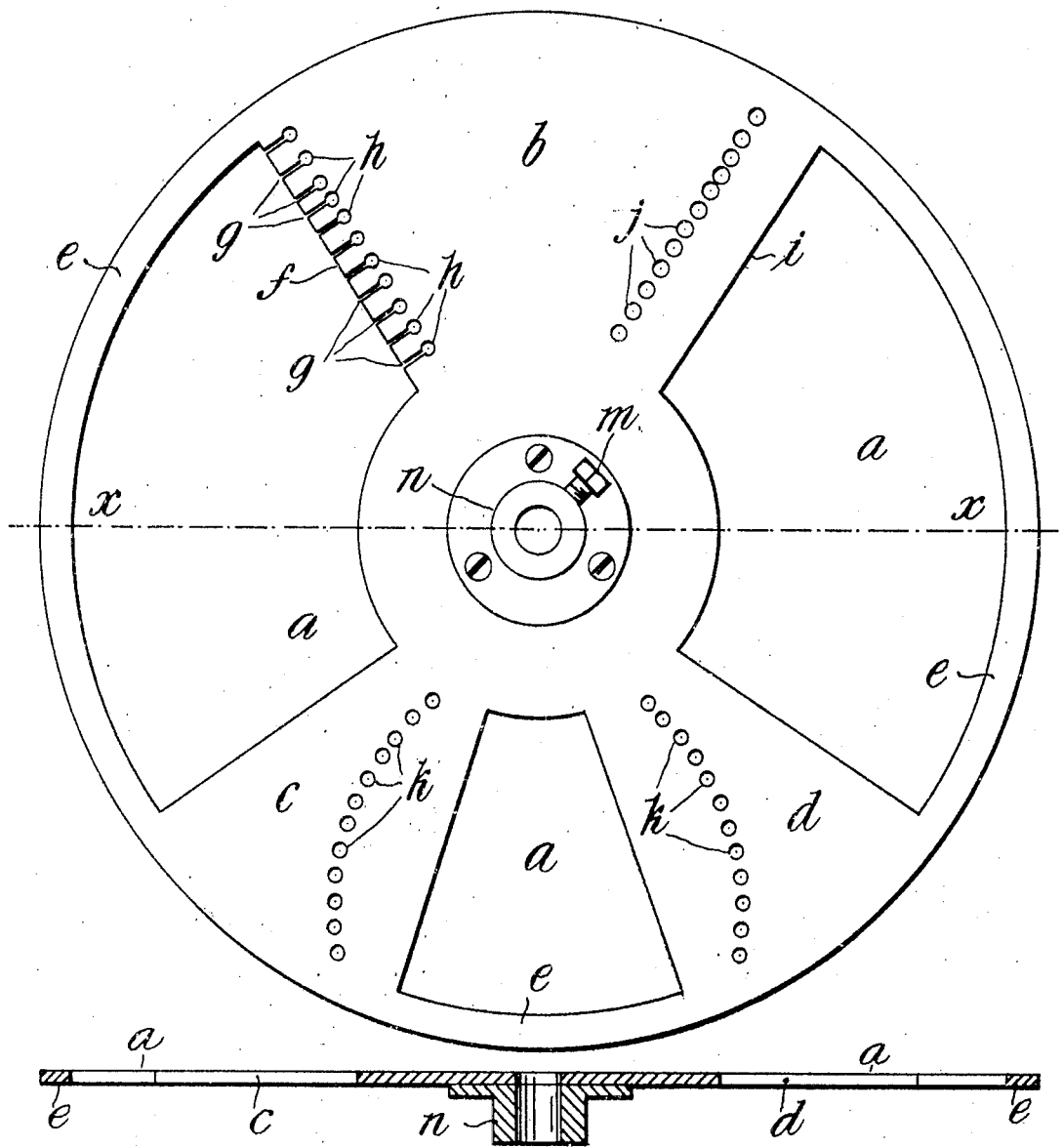

WILLIAM VIDLER, OF TOOTING, LONDON, ENGLAND.

CINEMATOGRAPH-PROJECTOR SHUTTER.

1,287,146.  Specification of Letters Patent.  Patented Dec. 10, 1918.

Application filed September 29, 1917. Serial No. 193,958.

*To all whom it may concern:*

Be it known that I, WILLIAM VIDLER, a subject of the King of Great Britain and Ireland, and resident of Tooting, county of London, England, have invented a certain new and useful Improvement in Cinematograph-Projector Shutters, of which the following is a specification.

My invention relates to an improved cinematograph projector shutter, and my invention is characterized in that by means of double balancing blades provided with a series of perforations arranged in arc formation but with arcs in opposite directions, I am enabled to minimize the periods of darkness, producing even at a slow speed a practically non-flickering picture.

For a clear understanding of the invention reference is to be had to the following description and accompanying sheet of drawings in which:—

Figure 1 is a front view, and

Fig. 2 a section on line $x$, $x$ of said Fig. 1.

The shutter is formed from a disk of metal or other suitable material provided with cut-away portions $a$, leaving three blades $b$, $c$ and $d$ joined together with rim $e$.

Of the blades $b$, $c$ and $d$ the blade $b$ is the cover blade and the blades $c$ and $d$ the double balancing blades.

The leading edge $f$ of the blade $b$ is formed in comb-like fashion by means of a series of parallel slits $g$ terminating in holes $h$, and at a suitable distance from the leaving edge $i$ of said blade and parallel therewith there is arranged a series of perforations $j$.

The blades $c$ and $d$ are provided with a series of perforations $k$ arranged in arc formation but with arcs in opposite direction, and by this arrangement of perforations there is avoided the sudden streak of light which would otherwise obtain if said perforations were in a straight line and parallel to the leading edges of said blades $c$ and $d$. Further, this arrangement of blades is equivalent to four blades, in that there obtains a period of darkness, a period of light, *i. e.* perforation, a period of darkness, a period of light, *i. e.* cut-away portion $a$, a period of darkness, then a period of light, *i. e.* the second perforations $k$, then a period of darkness, and then light, *i. e.* the next cut-away portion $a$.

The cover blade $b$ by its comb edge gives diffusion of light, then a period of darkness, then a period of light, *i. e.* perforations $j$, then a period of darkness, and finally light, *i. e.* the following cut-away portion $a$.

The shutter is attached to the spindle of the apparatus by means of a set-screw or the like $m$ passing through the boss $n$ of the shutter.

Having now described my invention, what I claim as new and desire to secure by Letters Patent of the United States is:—

1. A cinematograph projector shutter consisting of a disk having cut-away portions within its periphery to provide a cover blade and opposite spaced balancing blades provided with a series of perforations arranged in reversely related arcs to minimize the period of darkness.

2. A cinematograph projector shutter consisting of a disk having cut-away portions within its periphery to provide a cover blade, said cover blade having the leading edge thereof formed in comb fashion by a series of parallel slits terminating in holes and also having a series of perforations spaced from and parallel to the leading edge thereof, and a pair of balancing blades also formed in the disk by the cut-away portions opposite the cover blade and provided with a series of perforations arranged in reversely related arcs.

3. A cinematograph projector shutter consisting of a disk having a pair of relatively large cut-away portions within its periphery, and a relatively small cut-away portion between said two large cut-away portions, thus forming a relatively wide cover blade opposite the smallest cut-away portion and a relatively small balancing blade at each side of said relatively small cut-away portion, said cover blade having its leading edge of comb formation and also having a series of perforations spaced from its leaving edge, and said balancing blades being provided with reversely related arcs of perforations.

In testimony whereof I have affixed my signature in presence of two witnesses.

WILLIAM VIDLER.

Witnesses:
 E. NORTON,
 ROBT. HUNTER.